Sept. 23, 1969 G. H. LEE 3,469,039

MAGNETIC RECORDING AND REPRODUCING METHOD AND APPARATUS EMBODIED IN A MIMICKING PARROT OR DOLL

Filed Oct. 22, 1965 2 Sheets-Sheet 1

United States Patent Office 3,469,039
Patented Sept. 23, 1969

3,469,039
MAGNETIC RECORDING AND REPRODUCING METHOD AND APPARATUS EMBODIED IN A MIMICKING PARROT OR DOLL

George H. Lee, 572 Hickory Road,
Glen Ellyn, Ill. 60137

Filed Oct. 22, 1965, Ser. No. 501,113
Int. Cl. G11b 5/02
U.S. Cl. 179—100.2 8 Claims

ABSTRACT OF THE DISCLOSURE

In the class of entertainment devices wherein a sound recorder is associated with a similitude, such as a parrot or a doll, the improvement which comprises changing the speed of the recording medium, before reproducing, in a direction such that the pitch of the reproduced sound more closely approximates the inherent natural pitch of the similitude.

This invention relates generally to the talking doll or talking toy art, and more particularly, to an apparatus and method wherein a similitude, through the mechanism of sound recording and reproducing equipment, repeats or mimics a human vocalization.

The invention is applicable to devices wherein a loud speaker is placed proximate to, that is, within or in the vicinity of, a similitude, and a previously recorded sound recording of human vocalization is played back through the loud speaker to give the appearance that the similitude is talking.

The invention has advantage as applied to those classes of such devices wherein the similitude incorporates a complete endless tape type magnetic recording system, i.e. microphone, recorder-reproducer, and speaker, and, in the operation of which, the similitude gives the appearance of hearing, as well as repeating or mimicking, a relatively short human vocalization spoken to it. Examples of this particular class of device are the Little Miss Echo doll, sold by the American Doll and Toy Company, Brooklyn, N.Y., and The Bird, sold by Louis Marx and Company, New York, N.Y., and described in U.S. Patent No. 3,199,-248, Animated Talking Toy with Built-in Recorder, issued Aug. 10, 1965 in the name of Hisashi Suzuki. In these two devices, manual controls are provided on the similitude to control the operation as between record and reproduce, provision being made to permit the relatively short human expression just recorded to be played back almost immediately to give a parrotting or mimicking effect. Another example of this particular class of device is as disclosed in U.S. Patent No. 3,165,595, Magnetic Recording and Reproducing Device, issued Jan. 12, 1965, in the name of R. Noshiro, wherein realism is enhanced by the complete elimination of manual controls; the receipt of a sound signal automatically initiates two consecutive complete cycles of the endless tape, the first being a recording cycle and the second a reproducing cycle, the entire operation being automatically effected without any outside influence other than the initial human vocalization, itself.

In all of the prior art devices discussed above, the reproduced signal is physically identical to the recorded signal, within the limits, of course, of fidelity of the sound system employed. Thus, if a man speaks, for example, to The Bird discussed above, it will appear to mimic him in the man's own natural voice, recognizable as such.

The principal object of the present invention is to enhance the illusion that the similitude, itself, is talking in the above described classes of devices.

A more particular object of the invention is to enhance the illusion that the similitude is hearing, as well as mimicking, in the above described classes of devices.

Briefly, the above objects are accomplished by transforming the pitch of the recorded human vocalization, during the reproduction process, itself, to a pitch more characteristic of the particular similitude employed. More specifically, the speed of the recording medium is altered after the record cycle but before the reproduce cycle, to thereby correspondingly alter the pitch and the word speed, or tempo, of the vocalization, the direction of the alteration being such as to increase the speed of the medium, and therefore the pitch of the vocalization, where the similitude has, or might be expected to have, a higher pitch than an adult human, and vice versa. For example, where the similitude is a baby doll or a bird, either real or toy, the recording medium is driven at a higher speed during reproduce, to thereby raise the pitch, whereas, where the similitude is a frog, for example, the recording medium is driven at a lower speed during reproduce to thereby lower the pitch. A startlingly realistic effect of parrot mimicry is achieved when the principles of the invention are applied to a parrot similitude incorporating the recording-reproducing system of the aforesaid Noshiro patent, for example. In such case, by the simple expedient of making provision for an automatic increase in tape speed between the end of the record cycle and the beginning of the reproduce cycle, the parrot appears to hear a human expression and almost immediately thereafter to repeat it, not merely as a disguised version of the original, but also at the higher pitch and faster tempo, or word speed, characteristic of real life parrot mimicry.

While any change whatsoever in the speed of the recording medium sufficient to produce a discernible change in pitch, and in the right direction, will, of course, have some advantageous effect in enhancing the realism of this class of device, preferably a substantial change in speed is introduced in order to provide a substantial enhancement of the illusion. On the other hand, too great a change in speed of the recording medium, and resultant change in pitch and word speed, results in a reproduced signal which is unintelligible. It has been found, for example, that a full octave change in pitch, which would be produced by either doubling or halving the speed, i.e. changing the logarithm to the base ten of the speed by plus or minus 0.30, usually results in a reproduced signal which is unintelligible. Although the effect varies somewhat, depending upon the pitch and other characteristics of the original human vocalization, a practical upper limit to the magnitude of the change in logarithm to the base ten of the speed is about 0.25. A magnitude change in logarithm to the base ten of the speed in the range of about 0.05–0.20 is preferred since, in this range, the resultant reproduced signal is definitely a disguised and pitch transformed version of the original recorded signal, while still being definitely intelligible. In practice, a magnitude change in logarithm to the base ten of speed equal to 0.13 has been found to be very satisfactory. This corresponds to an increase in the speed of the recording medium of 35 percent or a decrease of 26 percent.

Other objects and advantages of the invention will become apparent from the following description, when read in connection with accompanying drawings, wherein.

Figure 1:
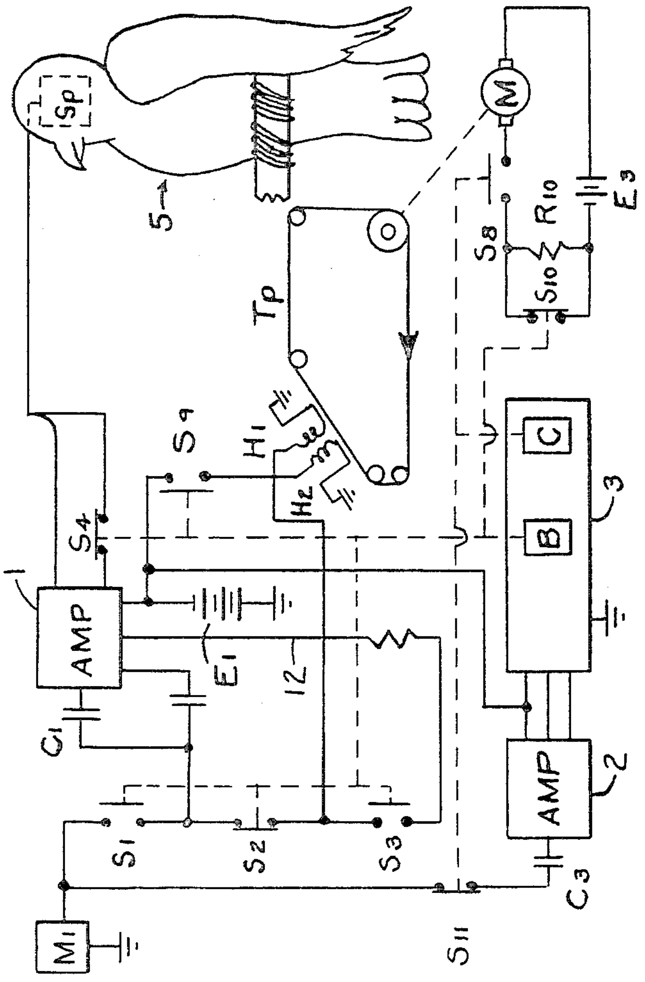
FIG. 1 is a schematic and wiring diagram illustrating the principles of the invention as applied to the aforesaid Noshiro device.

Referring now to FIG. 1, the circuitry and operation are, for the most part, identical to that of the Noshiro patent, to which reference is made for greater detail. The subject matter and operation which is common to the Noshiro device and the present invention will be briefly described first, the common elements bearing the same reference numerals.

An incoming sound signal (the beginning of a human vocalization) is received at microphone M1 and transmitted by way of condenser C3 and amplifier 2 to a rectifier and timing circuit 3 which circuit, among other elements, includes a relay B and a relay C. Through the action of rectifying means and an associated relay (not shown) rectifier and timing circuit 3 automatically and immediately operates to energize relay B, which relay, in turn, immediately energizes relay C. An R-C circuit, associated with relay B, holds relay B in its energized state for a "recording time period." T1, commencing with the initial receipt of a signal, and another R-C circuit, associated with relay C, holds relay C in its energized state for a "reproducing time period" T2, commencing with the deenergization of relay B. The time constants of the two R-C circuits are chosen such that the recording time period T1 is exactly equal to the time required for the motor M to drive the endless magnetic tape T*p* one complete revolution during the record cycle, and such that the reproducing time period T2 is exactly equal to the time required for the motor to drive the tape a complete revolution during the reproduce cycle. In the Noshiro device, these two time periods are equal, but, as will hereinafter be evident, they are unequal in the present invention.

During the recording time period T1, therefore, relays B and C are both energized, and during the reproducing time period T2, only relay C is energized. As indicated by the light dash lines, energization of relay C causes normally open switch S8 to close, thereby closing the supply circuit from battery E3 to the motor M, and the motor thereupon drives the magnetic tape T*p* for exactly two complete cycles, that is, until switch S8 again opens at the expiration of the reproducing time period T2.

Energization of relay B causes normally open switches S1, S3 and S9 to close for the duration of the recording time period T1 and the normally closed switches S2 and S4 to open for the duration of the recording time perior T1. Thus, during the recording time period T1, the sound signal being received at microphone M1 is transmitted, via switch S1, condenser C1, amplifier 1, amplifier output lead 12 and switch S3, to the grounded recording-reproducing head H1, thereby recording the sound signal on the magnetic tape. The closing of switch S9 simultaneously permits a D.C. erasing current to flow from battery E1 through the grounded erasing head H2, thereby causing any previously recorded signal to be erased for the duration of the recording time period T1.

At the expiration of the recording time period T1, deenergization of relay B causes termination of recording and erasing by permitting switches S1, S3 and S9 to return to their normal open positions. Simultaneously, deenergization of relay B permits switches S2 and S4 to return to their normal closed positions, whereby a circuit is completed from the recording-reproducing head H1 through switch S2, condenser C1, amplifier 1, and switch S4 to the loud speaker S*p*. The sound signal on the magnetic tape is thus reproduced at the speaker S*p* for the duration of the reproducing time period T2, at the expiration of which, deenergization of relay C permits switch S8 to open, opening the supply circuit to the motor and stopping the tape.

There has thus far been described the elements and the operation of the Noshiro device. The new elements not disclosed in the Noshiro patent and their effect on the operation will now be described.

In the rectifier and timing circuit 3 of the Noshiro device, means are provided to remove the operation of relay B from the control of the incoming sound signal for the duration of the recording time period T1, once relay B is initially energized. However, at the expiration of the recording time period T1, when relay B deenergizes, the incoming signal is reestablished in control of relay B. Thus, an incoming sound signal received during the reproducing time period T2 would serve undesirably to energize relay B and start a new sequence of recording time period T1 and reproducing time period T2. In order to avoid this, a normally closed switch S11 has been inserted in the device at FIG. 1 in series between the microphone M1 and condenser C3, this switch being under the control of relay C. Thus, by virtue of the energization of relay C for the duration of both time periods T1 and T2, switch S11 is maintained open for the duration of both time periods T1 and T2, and the operation of both relays B and C is thereby removed from the control of any further incoming signal received by microphone M1 for the entire duration of both time periods.

A similitude 5, illustrated, in the form of a parrot, is also shown in FIG. 1. Although shown, for convenience, as incorporating only the loud-speaker S*p*, so as to create the illusion of speaking, preferably the entire recording-reproducing system, including the microphone M1, is incorporated in the similitude, or in its mounting base or cage so as to create the illusion of hearing, as well as mimicking what it has heard.

In accordance with the principles of the present invention, the Noshiro device has been modified to make provision for effecting a change in speed of the magnetic tape T*p* at the expiration of the recording time period T1 and the beginning of the reproducing time period T2. For this purpose, a resistor R10 has been inserted in the series circuit consisting of battery E3, motor M, and switch S8, and there has also been added a normally closed switch S10, responsive to energization of relay B, and connected across resistor R10 so as to short circuit same when in its normal closed position.

In the operation of the modified motor circuit, the energization of relay B holds switch S10 open and retains resistor R10 in series with the motor during the recording time period T1. With resistor R10 in the series circuit, the motor M drives the tape at a given constant velocity. At the expiration of the recording time period T1, switch S10 returns to its normal closed position and remains in that position for the duration of the reproducing time period T2. Since closing of switch S10 shorts out resistor R10, the motor will drive the tape at a greater constant velocity during the entirety of the reproducing time period T2. By this simple modification of the motor circuit of Noshiro, the human vocalization recorded during time period is reproduced during the reproducing time period at the faster tempo and higher pitch characteristic of parrot mimicry of the human voice, thereby sharply enhancing the overall illusion.

The value of the resistance R10 is chosen so as to provide the desired difference between the recording tape speed and the reproducing tape speed so as to convert the pitch of the recorded human expression to one at least approximating the natural pitch of the thing simulated. In the example illustrated, since the similitude is a parrot which has a higher natural pitch than a human, the reproducing tape speed is caused to be greater than the recording tape speed. If the similitude were a frog, for example, the motor circuit would be modified in a similar manner to cause the reproducing tape speed to be less than the recording tape speed, to thereby lower the pitch. As previously indicated in the introductory portion of this specification, there are certain limits to the magnitude of the change in tape speed which must be observed, if the reproduced vocalization is to retain intelligibility. In the particular embodiment disclosed, very satisfactory results are obtained when the value of resistance R10 is chosen such that the tape speed during reproduction is 35 percent greater than the tape speed during recording.

Since the tape speed is 35 percent greater during reproduction than during recording, it is obvious that one complete revolution of endless tape T*p* will require 35 percent more time during recording than during reproduction. Accordingly, the time constants of the aforementioned R-C circuits associated respectively with relays B and C in the rectifier and timing circuit 3 are selected so that the recording time period T1 is 35 percent greater than the reproducing time period T2 and so that the tape makes exactly one complete revolution during the recording time period T1 and also makes exactly one complete revolution during the reproducing time period T2.

It is desired to stress at this point that the application of the principles of the invention to specifically the Noshiro device, and the specific means disclosed herein for so applying the principles, are strictly illustrative. Talking similitudes can be designed in myriad different ways using any number of different sound recording systems, relay control circuitry, and the like. Similarly, tape drive speed can be controlled in many ways other than the specific means disclosed herein. It will be readily apparent to one skilled in the art how the broad principles of the present invention, namely reproducing at a different speed than the recording speed, the difference being such as to make the pitch of the reproduction approximate the natural pitch of the similitude, may be applied in many different ways to the many and diverse classes of talking similitudes.

Figure 2:
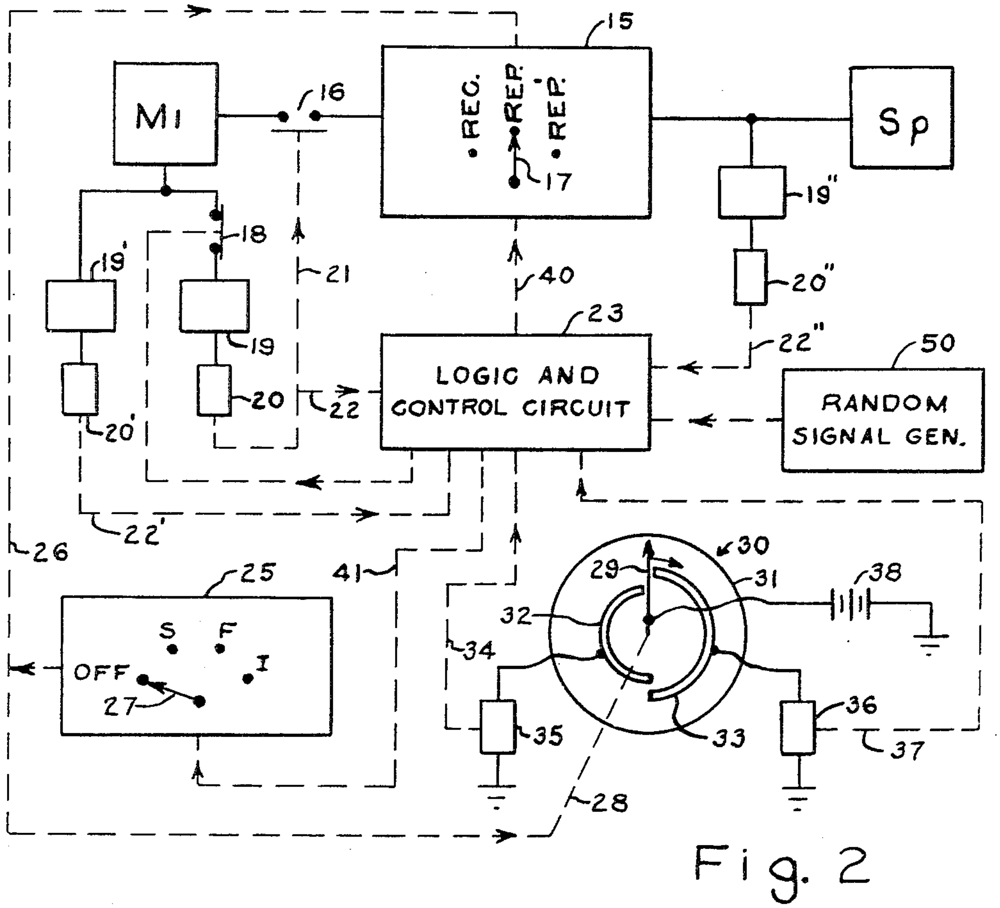
FIG. 2 is a schematic and wiring diagram illustrating a more sophisticated version of the invention incorporating several additional improvements to further enhance the illusion of similitude mimicry of the human voice.

In the Noshiro device, and as described with respect to FIG. 1, two R-C circuits in the rectifier and timing circuit 3 are employed as the timing means to define the periods T1 and T2, the time constants of these circuits being selected so that time period T1 exactly equals the time required for the tape to make exactly one revolution at its record speed and so that time period T2 exactly equals the time required for the tape to make exactly one revolution at its reproduction speed. It will be readily apparent that the tape, itself, or its driving means, can be used as a more direct and exact timing means. In FIG. 2, there is illustrated an embodiment of the present invention which utilizes the tape drive, itself, as the timing means.

The embodiment of FIG. 2 also incorporates several refinements adapted to overcome certain disadvantages in the device of FIG. 1, thereby enhancing even further the illusion that the similitude is hearing and then mimicking the human vocalization. Perhaps the major disadvantage detracting from the realism of the device of FIG. 1 involves the possibility of the reproduction being of an incomplete expression, i.e. either starting or stopping in the middle of a human expression. For example, if the human vocalization is of a longer duration than the recording time period T1, recording will be cut off before the human vocalization is complete, and the incomplete expression is, of course, what will be reproduced. Similarly, if the human expression is short relative to the recording time period T1, the human vocalizer may begin vocalizing a second expression after the reproduction has been completed but still during the reproducing time period T2. The reproduction of the second expression will, in such case, unrealistically begin in mid-expression since the beginning of the second expression will not have been recorded.

Another disadvantage of the FIG. 1 device involves the variable delay time between the termination of the human vocalization and the beginning of its reproduction; if the human vocalization is short relative to the recording time period T1, the reproduction thereof does not commence immediately, as would be most desirable, but must await the completion of the remainder of the recording time period T1.

Referring now to FIG. 2, there is disclosed sophisticated embodiment of the invention having provision for overcoming all of the just discussed disadvantages. Such embodiment might best be employed to simulate parrot mimicry in a zoo or an amusement park. A microphone M1 feeds an endless tape recorder-reproducer 15 through normally open switch 16. A loud-speaker S*p*, which will be understood to be disposed within, or in the vicinity of, the similitude is connected to the output of the recorder-reproducer. The microphone M1 is also preferably located at a point proximate to the similitude.

The recorder-reproducer has conventional means and circuitry for defining the usual two modes of operation, in the first one of which a signal received from the microphone is recorded on the recording medium while any previous signal is simultaneously being erased, and in the second (normal) one of which any signal recorded on the recording medium is reproduced at the loudspeaker. A switch 17 is shown to symbolically represent the switching means included within the recorder-reproducer to control its operative condition as between record-erase condition (Rec.) and reproduce condition (Rep.). The recorder-reproducer 15 may, for example, constitute the apparatus shown in FIG. 1 in its entirety with the exception of elements M1, S*p*, 5, S11, C3, 2, 3, B, C, S10, R10, S8, E3 and M, in which case switch 17 would represent switches S1, S2, S3, S4 and S9.

The output of microphone M1 is also connected through a normally closed switch 18 to a rectifier circuit 19 the output of which is connected to energize an associated relay 20 whenever an audio signal is being received from microphone M1. The rectifier 19 and its associated relay 20, may, for example, be the commercially available VOICE-MATIC, sold by Kinematix, Inc., Chicago, Ill., as an automatic on-off control for tape recorders. This device has sensitivity and pause controls which are adjusted, in the present application, such that the relay will not be energized unless the incoming signal is of a sufficient volume and of a sufficient duration (more than a momentary noise) and such that the relay will not be deenergized by a momentary pause in the human vocalization.

As indicated by dash line 21, relay 20 controls the position of switch 16 so that this switch is closed whenever rectifier 19 is receiving an audio signal from microphone M1. As indicated by dash line 22, information as to the energized or deenergized state of relay 20 is also fed to a logic and control circuit 23.

An identical rectifier 19' and associated relay 20' are provided, the rectifier 19' receiving its input directly from microphone $M_1$, that is, above switch 18. Information as to the current receipt or non-receipt of an incoming sound signal by microphone $M_1$ is thus also fed into logic and control circuit 23, as indicated by dash line 22'.

An identical rectifier 19'' and associated relay 20'' are provided, the rectifier being connected to receive its input directly from the output of recorder-reproducer 15. Information as to whether or not loud-speaker S*p* is currently reproducing is thus also fed into logic and control circuit 23, as indicated by dash line 22''.

A motor and control circuit 25 is connected to drive the endless tape in recorder-reproducer 15, as schematically indicated by dash line 26. In the present embodiment of the invention, the motor has four operative conditions, as symbolically represented by switch 27: slow speed (S); fast speed (F); intermediate speed (I); and "off."

As schematically indicated by dash line 28, the motor also drives the wiper arm of a rotary switch 30 which constitutes the timing means of this embodiment of the invention. The drive ratios are such that wiper arm 29 makes exactly one half revolution for every complete revolution of the endless tape. The wiper arm is driven in a clockwise direction, as indicated.

Forming part of the rotary switch 30 is a circular insulating base 31 carrying two circular conductors 32 and 33 which are connected to ground through associated relays 35 and 36, respectively. Since wiper arm 29 is connected to ground through a battery 38, the respective relays 35 and 36 will be energized whenever wiper arm 29 is in a position such as to make contact with their associated conductors 32 and 33.

Conductor 33, which is associated with the first, or recording, cycle of the endless tape, is shaped as a full half circle except for the absence of a small arc at its top, and conductor 32, which is associated with the second, or reproducing, cycle of the endless tape, is a similarly shaped half circle except for an identical small arc at its top. As shown, conductors 32 and 33 are facing and coaxial, conductor 32 having a somewhat smaller radius than conductor 33. It will be apparent that, except when wiper arm 29 lies in the small arc constituting its rest position, either relay 36 or relay 35 will be energized, depending on whether the tape is in its first or second cycle, respectively. As indicated by dash lines 34 and 37, respectively, information as to the states of energization of relays 35 and 36, and therefore as to the position of wiper arm 29, is transmitted to the logic and control circuit 23. If neither relay is energized, the endless tape and wiper arm 29 are in their rest positions.

As indicated by dash lines 40 and 41, respectively, logic and control circuit 23 controls the operative condition of recorder-reproducer 15 and the operative condition of motor and control circuit 25. Logic and control circuit 23 consists of conventional logic elements, such as "or," "and," and "and/or" relays, and the like, connected in a conventional manner to achieve a predetermined programmed response to information as to current conditions, as represented by the states of relays 20, 20′, 20″, 35 and 36.

The initial or normal condition of the device of FIG. 2 with no human vocalization occurring is as follows: relays 20, 20′ and 20″ are deenergized; switch 16 is open; wiper arm 29 and the endless tape are stationary and the wiper arm is in its straight up position; relays 35 and 36 are deenergized; the motor is in its "off" condition; and recorder-reproducer 15 is in its reproduce condition.

In the operation of the device of FIG. 2, receipt of an incoming signal, except under certain conditions as will later be explained, energizes relays 20 and 20′, the latter immediately closing switch 16 to connect the microphone to the recorder-reproducer. Logic and control circuit 23, in response to energization of relay 20, acts to set the motor and control circuit at "slow," its recording speed. The endless tape and the wiper arm 29 then simultaneously begin to move, thereby energizing relay 36. Energization of relay 36 immediately operates through logic and control circuit 23 to switch recorder-reproducer 15 to its record-erase condition.

The deenergization of relay 20 at the end of the human vocalization permits switch 16 to return to its normal open position. Logic and control circuit simultaneously operates in response to deenergization of relay 20 to open normally closed switch 18 and to keep it open until released by the deenergization of relay 35, when the wiper arm has returned to its rest position. Thus, once a single unitary expression has been recorded, relay 20 will not again respond to a human vocalization until the two cycles of the endless tape have been completed.

If relay 20 deenergizes while relay 36 is still energized, that is, during the first or recording cycle of the tape, the logic and control circuit 23 operates to set the motor at "fast," which speed is several times faster than "slow,"—comparable to the rewind speed of a conventional magnetic recorder. The tape will thereupon complete its first or recording cycle at this fast speed, thereby reducing the time delay between the end of the human vocalization and the beginning of its reproduction. During the fast tape speed period, since relay 36 is still energized, the recorder-reproducer is still retained in its record-erase condition so that the erasing function continues for the entire duration of the recording cycle.

When relay 36 deenergizes and relay 35 energizes at the expiration of the first or recording cycle, the logic and control circuit 23 operates, if by this time relay 20 has deenergized, to set the motor at "intermediate," its reproducing speed, which speed bears the same relationship to its slow or recording speed as previously described with respect to FIG. 1. Simultaneously, under such conditions, the logic and control circuit returns the recorder-reproducer to its normal reproduce condition. The tape will then continue at its intermediate speed until deenergization of relay 20″ signals the termination of reproduction of the vocalization, at which signal the logic and control circuit 23 operates to set the motor at "fast." The tape will then continue at its fast speed until the end of its second or reproduce cycle, a which time deenergization of relay 35 will, through the logic and control circuit 23, operate to switch the motor to "off" and release switch 18 to its normal closed position.

The logic and control circuit places an additional constraint, not so far described, upon the release of switch 18 to its normal closed position, once it has been opened; the logic and control circuit will not release switch 18 as long as relay 20′ is still energized. Thus, any new recording must start at the beginning of a unitary human vocalization and cannot start with the remainder of a vocalization which began during the preceding reproduce cycle.

Returning to the operation initiated by the receipt of an incoming signal at rectifier 19 and the resulting energization of relay 20, if, when relay 36 deenergizes and relay 35 energives, relay 20 has not yet deenergized, that is, if the human vocalization extends beyond the first, or recording cycle, the logic and control circuit will not operate to release the recorder-reproducer to its normal reproduce condition and to switch the motor to "intermediate," but will instead, retain the recorder-reproducer in its record-erase condition and will set the motor at "fast" for the duration of the second or reproduce cycle of the tape. Deenergization of relay 20 during the second or reproduce cycle is ineffective to produce any change, the recorder-reproducer continuing in its record-erase condition until released by the deenergization of relay 35, and the motor continuing at its fast speed until switched to "off" by the deenergization of relay 35. In this manner, any vocalization extending beyond the recording cycle is not reproduced at all that is, not even from the beginning of the vocalization and the possibility of a reproduction ending in mid-expression is obviated.

While the mimicking similitude of FIG. 2, as thus far described, is extremely realistic, it, nevertheless, has an automatic and predictable quality not entirely characteristic of a parrot; the human vocalization is always reproduced (unless it is too long) and always exactly once, and nothing else is ever said by the parrot. It is apparent that realism would be even further enhanced by injecting an element of unpredictability into the parrot's response to human vocalization. For this purpose, a random signal generator 50 is provided to transmit random overriding signals to the logic and control circuit 23, and the recorder-reproducer is provided with a set of stored prerecordings and another associated operative condition, represented by the "rep.′" position of switch 17, in which condition a prerecording is directly connected to be reproduced at the loud-speaker. The logic and control circuit 23 operates in a random manner in response to the random over-riding signals to over-ride or modify the previously described operation so as to occasionally ignore the human vocalizer completely, to occasionally reproduce the human vocalization more than once, and to occasionally reproduce one or another of the stored prerecordings.

It will be readily apparent that another conductor and associated relay could be added to rotary switch 30 at about the 175 degree point to signal the imminent beginning of the reproduce cycle. Such a signal could operate through the logic and control circuit 23 to switch the motor to intermediate at this 175 degree point, in the event that relay 20 had already deenergized and the motor had been switched to fast, thereby providing a period of time for the motor to adjust from fast to intermediate speed prior to the actual beginning of the reproduce cycle.

Those skilled in the magnetic recording and switching arts will readily perceive how, with slight modification of the motor and control circuit 25 and the rotary switch 30, the general operating principles of FIG. 2 could be adapted to a conventional magnetic recorder of the type having a discrete length of tape and wind-up reels rather than an endless tape. In such event, the fast motor speed would be in a reverse, or rewind, direction.

Figure 3:
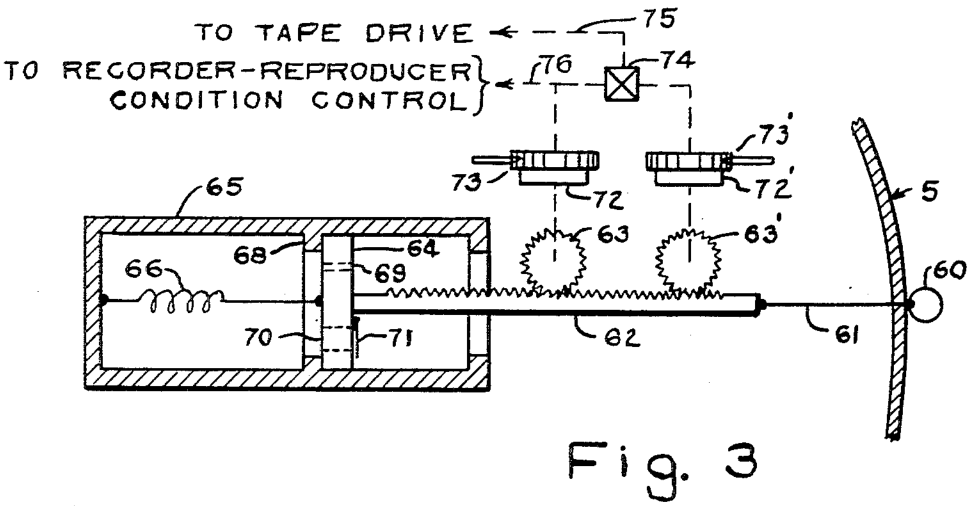
FIG. 3 is a schematic diagram illustrating the application of the invention to the simple pull ring type talking similitude of the Chatty Cathy variety.

Referring now to FIG. 3, wherein there is shown an application of the invention to the simple pull ring type talking toy, there is disclosed a pull ring 60 in its innermost position. The ring 60 has attached to it the usual string 61 which, in turn, is attached to a rack 62 which drives two adjacent pinions 63, 63'. Rack 62 is attached to a piston 64 which rides in an air cylinder 65. A tension spring 66 is connected between the piston and the inner end of the cylinder in order to urge the piston to the innermost point of its travel, as defined by annular interior stop 68. Extending axially through the piston are two air holes 69 and 70. Hole 70 is larger than hole 69 and it has a light weight hinged flap valve 71 covering its outer end.

In the operation of the device as thus far described, the time period required to manually pull ring 60 all the way out is relatively long and also substantially constant, irrespective of the force applied, because the air can pass only through the small hole 69. This time period constitutes the recording time period. The time period required for the spring to pull the piston back to its innermost position, after ring 60 has been released, is also relatively constant, but it is shorter because the opening of flap valve 71 makes the larger hole 70 available for the passage of air. This latter time period constitutes the reproduction time period.

Pinions 63, 63' drive friction discs 72, 72' which frictionally engage the lower side of gear and ratchet assemblies 73, 73', which assemblies are oppositely ratchetted so as to permit rotation only in opposite directions. Thus, during outward travel of rack 62, assembly 73 will be actuated and assembly 73' will be held stationary, and during inward travel of rack 62, assembly 73' will be actuated and assembly 73 will be held stationary. The outputs of assemblies 73 and 73' are combined in differential 74, the output of which is a unidirectional drive which is used, as schematically indicated by dash line 75, as the tape drive for the endless tape type recorder-reproducer (not shown), the gearing being designed such that each complete half cycle of piston movement produces exactly one revolution of the tape. The state of gear assembly 73, that is, either in motion or stationary, is indicative of the direction of travel of piston 64, and this information is supplied, as schematically indicated by dash line 76, to the recorder-reproducer to control its operative condition, as between erase-record and reproduce conditions, such that the recorder-reproducer is constrained to its erase-record condition whenever the assembly is in motion and is constrained to its reproduce condition whenever the assembly is stationary.

In operation, a human expression vocalized during the recording time period, that is, while the piston 64 is being manually pulled out by the ring 60, is recorded on the endless tape. During the reproducing time period, that is, while piston 64 is returning to its inner position, the just recorded expression is automatically reproduced, but at a higher pitch. The relative size of holes 69 and 70 will, of course, determine the relative inward and outward speed of piston 64. As previously indicated, a reproduce tape speed 35 percent greater than the record tape speed provides a satisfactory pitch transformation.

The invention is susceptible to various modifications and alternative constructions other than the specific embodiments shown in the drawings and described herein, and it is to be understood that I do not intend to limit my invention to such embodiments but rather intend to cover all modifications and equivalent constructions falling within the spirit and scope of the invention as expressed in the appended claims. When, in this specification and appended claims, I state that a recording step, or a reproducing step, is carried out at a point proximate to the similitude, I intend to mean only that at least the initial conversion from an audio pressure signal to an audio electrical signal in the case of recording, and at least the final conversion from an audio electrical to an audio pressure signal in the case of reproducing, are carried out at a point proximate to said similitude.

I claim:

1. A method for effecting realistic apparent mimicry of the human voice by a three dimensional similitude comprising the steps of recording, at a point proximate to said similitude, a relatively short human expression on an endless movable sound recording medium by moving said recording medium past its associated recording head at a constant first velocity, while a human is vocalizing said expression, and substantially immediately thereafter, reproducing, at a point proximate to said similitude, an apparent mimicry of said human expression by moving said recording medium past its associated reproducing head at a different constant second velocity, the difference between said first and second velocities being such, in magnitued and direction, as to convert the pitch of the recorded human expression to a pitch approximating the natural pitch of the thing simulated by the similitude.

2. A method, as claimed in claim 1, wherein the magnitude of the difference between the respective logarithms to the base ten of said two velocities lies in the range 0.05 to 0.20.

3. A method, as claimed in claim 1, wherein the magnitude of the difference between the respective logarithms to the base ten of said two velocities is about 0.13.

4. A method, as claimed in claim 1, wherein the magnitude of the difference between the respective logarithms to the base ten of said two velocities is less than about 0.25.

5. In apparatus of the class described comprising a three dimensional similitude and a recording-reproducing sound system associated therewith, said sound system including a microphone located at a point proximate to said similitude, a loud-speaker located at a point proximate to said similitude, an endless movable recording medium, motive means for driving said recording medium, and circuit means, including switches and at least one recording head disposed adjacent said recording medium, for defining two operative conditions of said sound system, in one of which operative conditions a sound signal received by said microphone is recorded on said medium and any previous signal is simultaneously erased, and in the other of which operative conditions, a sound signal recorded on said medium is reproduced by said loud-speaker, in combination, means associated with said motive means for establishing exactly two different discrete forward speeds of said recording medium, the magnitude of the difference between the respective logarithms to the base ten of said speeds being less than about 0.25, and automatic control means, associated with said circuit means, for constraining the lower of said two discrete speeds to the recording operative condition of said sound system, and for constraining the higher of said two discrete speeds to the reproducing operative condition of said sound system, whereby said apparatus is adapted to substantially immediately reproduce a higher frequency and shorter duration version of any recorded signal, thereby giving the appearance of higher pitched mimicry by said similitude of any human vocalization occurring during the recording operative condition of said sound system.

6. Apparatus, as claimed in claim 5, further including timing means for defining a first and an immediately consecutive second complete cycle of said endless medium, and control means for constraining said recording operative condition of said sound system to said first cycle and for constraining said reproducing operative condition of said sound system to said second cycle.

7. In apparatus of the class described comprising a three dimensional similitude and a recording-reproducing sound system associated therewith, said sound system including a microphone located at a point proximate to said similitude, a loud-speaker located at a point proximate to said similitude, an endless movable recording medium, motive means for driving said recording medium, and circuit means, including switches and at least one recording head disposed adjacent said recording medium, for defining two operative conditions of said sound system, in one of which operative conditions a sound signal received by said microphone is recorded on said medium and any previous signal is simultaneously erased, and in the other of which operative conditions a sound signal recorded on said medium is reproduced by said loud-speaker, in combination, means associated with said motive means for establishing exactly two different discrete forward speeds of said recording medium, the magnitude of the difference between the respective logarithms to the base ten of said speeds being less than about 0.25, and automatic control means, associated with said circuit means, for constraining the higher of said two discrete speeds to the recording operative condition of said sound system, and for constraining the lower of said two discrete speeds to the reproducing operative condition of said sound system, whereby said apparatus is adapted to substantially immediately reproduce a lower frequency and longer duration version of any recorded signal, thereby giving the appearance of lower pitched mimicry by said similitude of any human vocalization occurring during the recording operative condition of said sound system.

8. Apparatus, as claimed in claim 7, further including timing means for defining a first and an immediately consecutive second complete cycle of said endless medium, and control means for constraining said recording operative condition of said sound system to said first cycle and for constraining said reproducing operative condition of said sound system to said second cycle.

References Cited

UNITED STATES PATENTS

| | | | |
|---|---|---|---|
| 2,281,405 | 4/1942 | Barrish | 179—100.2 |
| 2,815,401 | 12/1957 | O'Dwyer | 179—100.1 |
| 3,199,248 | 8/1965 | Suzuki | 179—100.2 |

BERNARD KONICK, Primary Examiner

J. R. MULLINS, Assistant Examiner

U.S. Cl. X.R.

46—117, 232